No. 793,651. PATENTED JULY 4, 1905.
R. A. FESSENDEN.
AERIAL FOR WIRELESS SIGNALING.
APPLICATION FILED MAR. 30, 1905.
8 SHEETS—SHEET 1.
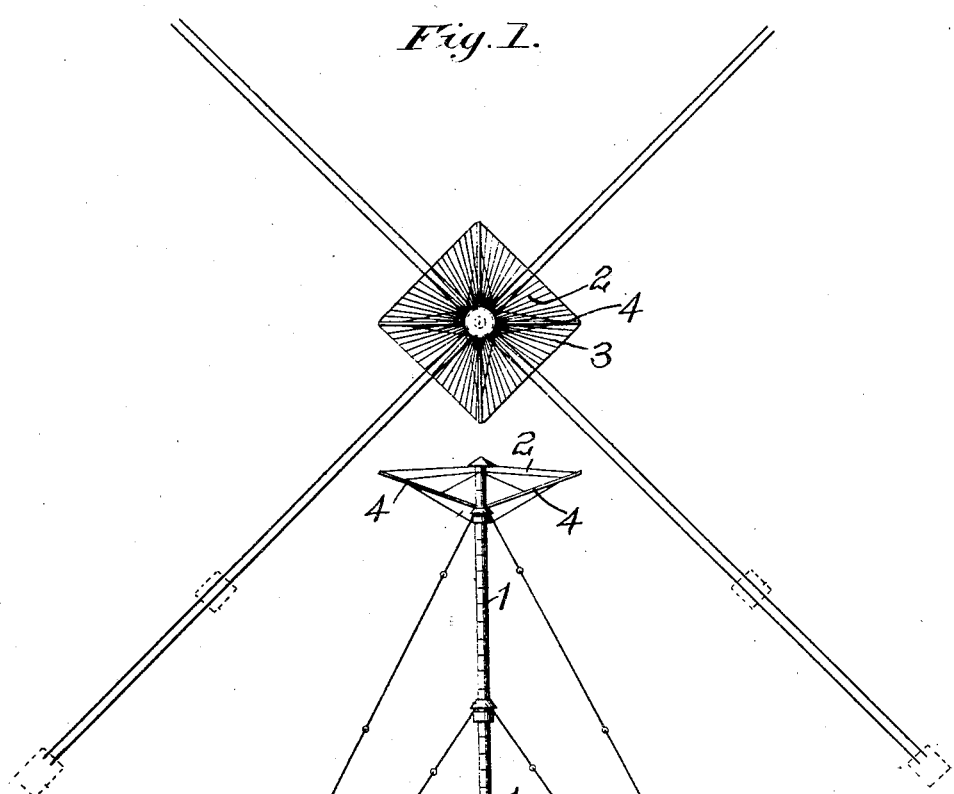
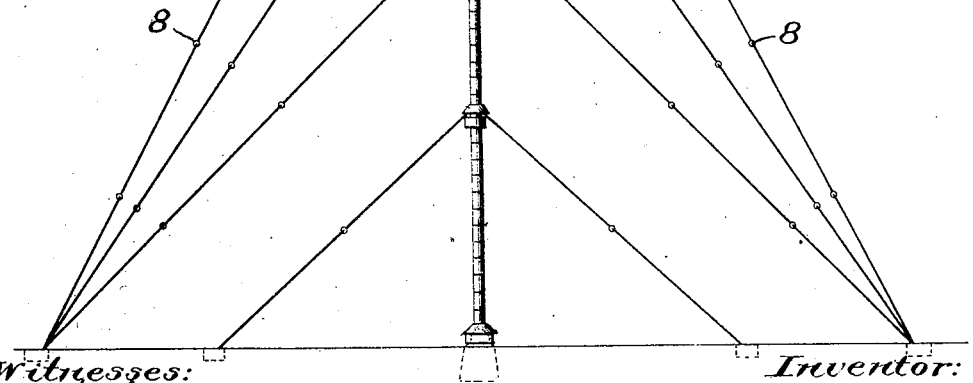

No. 793,651. PATENTED JULY 4, 1905.
R. A. FESSENDEN.
AERIAL FOR WIRELESS SIGNALING.
APPLICATION FILED MAR. 30, 1905.
8 SHEETS—SHEET 2.
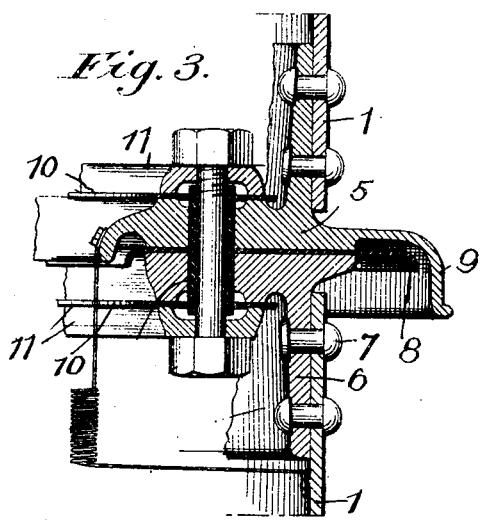
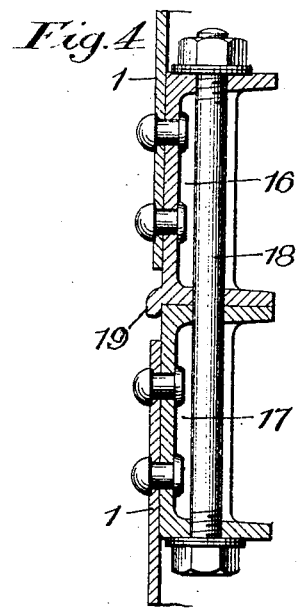
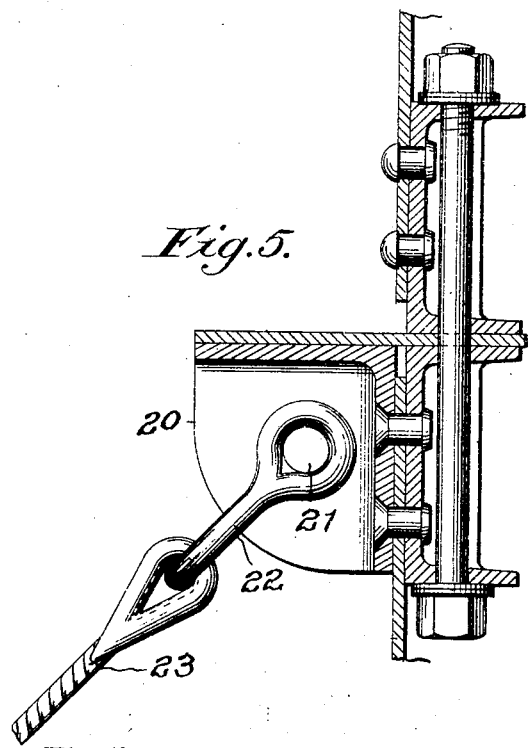
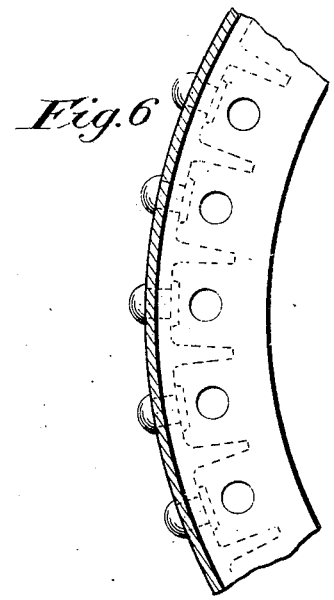
Witnesses:
Fred Kirchner
Herbert Bradley
Inventor:
Reginald A. Fessenden
by Samuel B. Wolcott
Atty No. 793,651. PATENTED JULY 4, 1905.
R. A. FESSENDEN.
AERIAL FOR WIRELESS SIGNALING.
APPLICATION FILED MAR. 30, 1905.
8 SHEETS—SHEET 4.
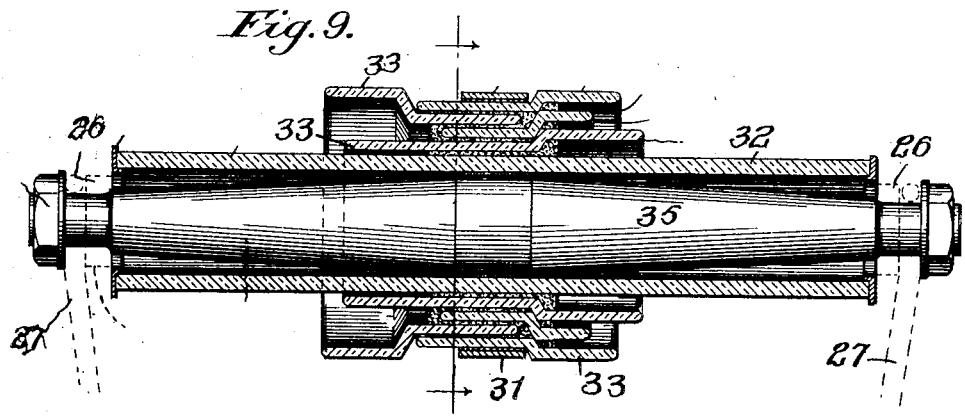
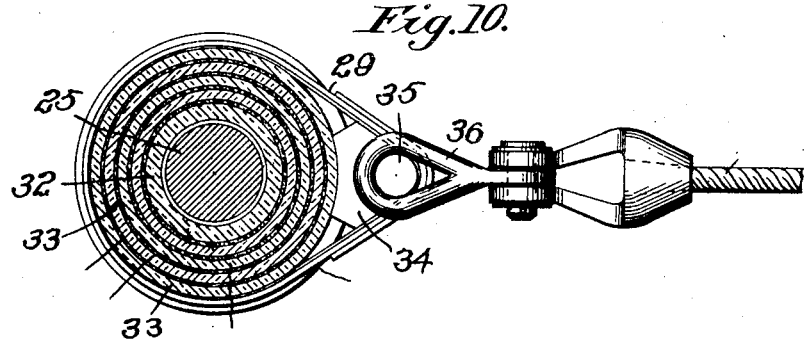
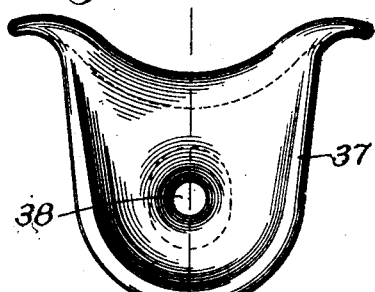 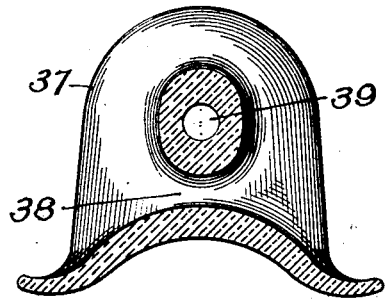
Witnesses:
Fred Kirchner
Herbert Bradley
Inventor:
Reginald A. Fessenden
by Dennis S. Wolcott atty

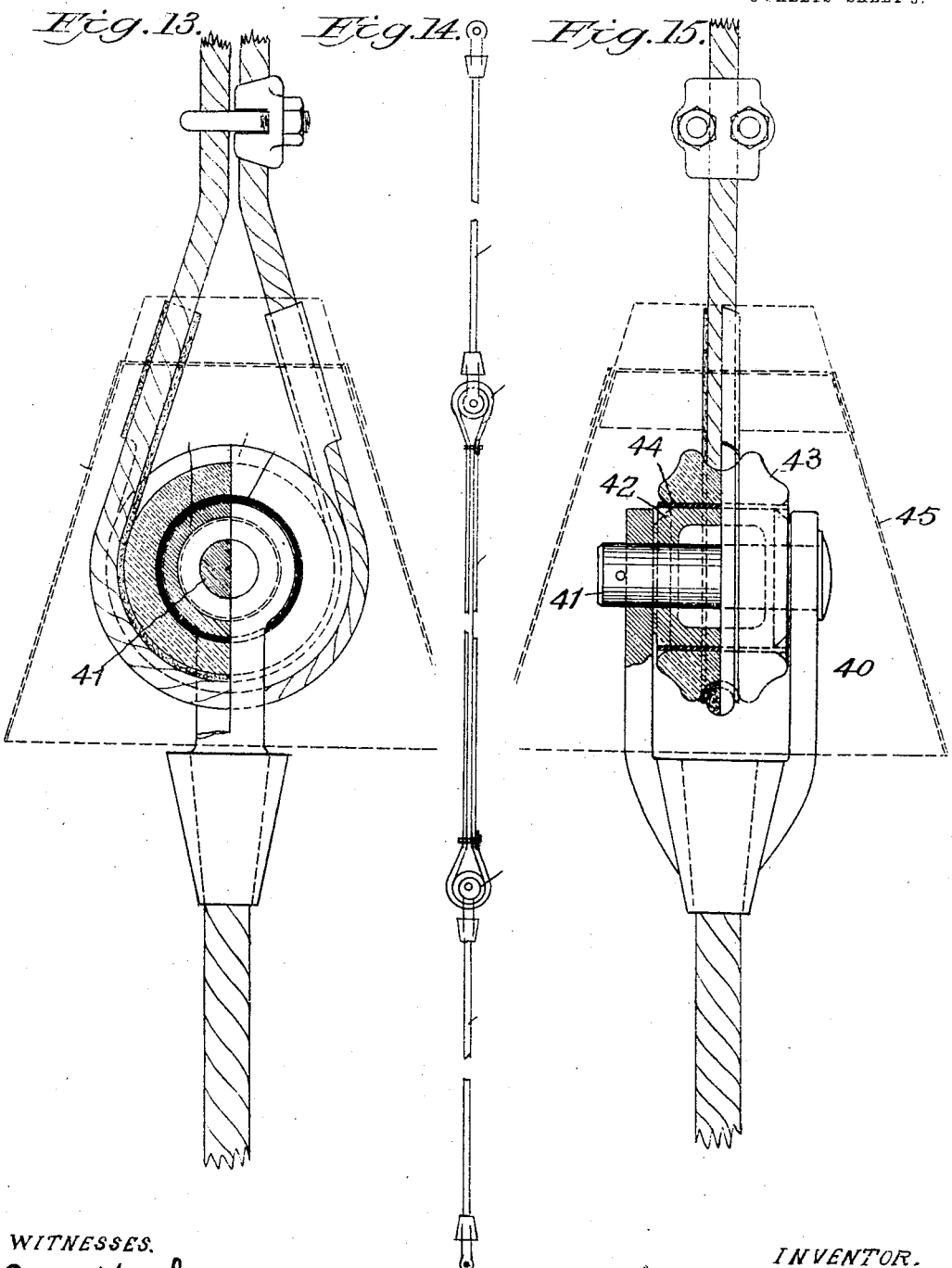

No. 793,651. PATENTED JULY 4, 1905.
R. A. FESSENDEN.
AERIAL FOR WIRELESS SIGNALING.
APPLICATION FILED MAR. 30, 1905.

8 SHEETS—SHEET 6.

WITNESSES.
Fred Kirchner.
Herbert Bradley.

INVENTOR.
Reginald A. Fessenden
by Damon S. Wolcott
ATTORNEY.

No. 793,651. PATENTED JULY 4, 1905.
R. A. FESSENDEN.
AERIAL FOR WIRELESS SIGNALING.
APPLICATION FILED MAR. 30, 1905.
8 SHEETS—SHEET 7.
*Fig. 19.*      *Fig. 20.*
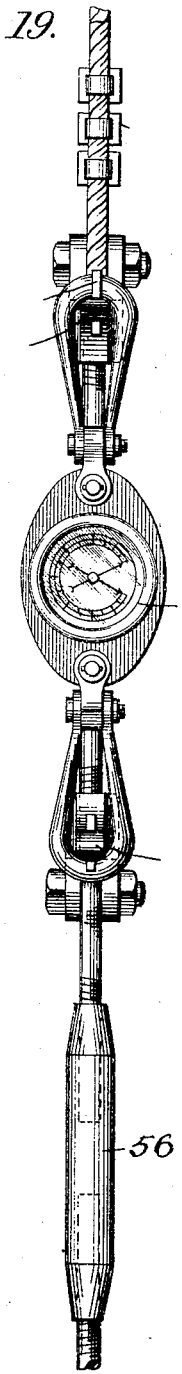
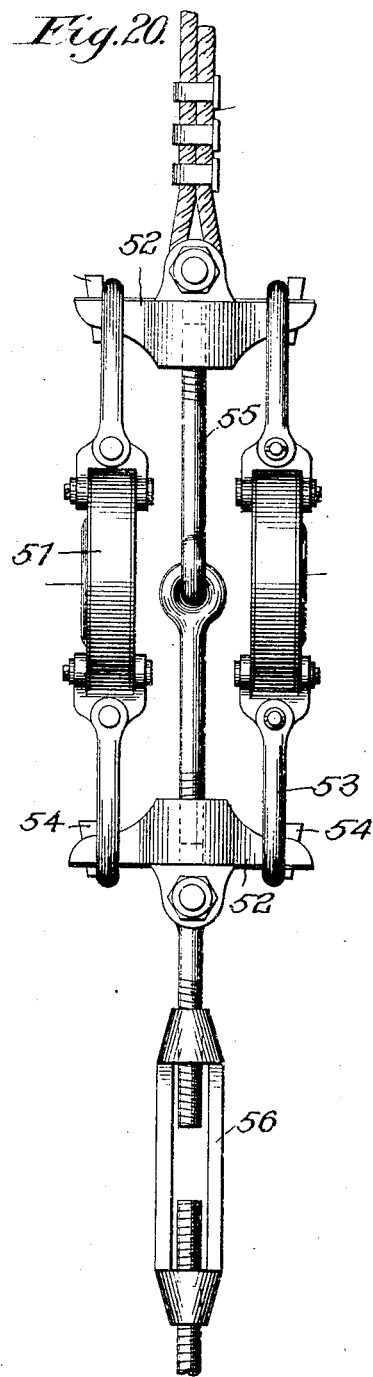
Witnesses:
Fred Kirchner.
Herbert Bradley.
Inventor:
Reginald A. Fessenden
by Samuel S. Wolcott
Atty No. 793,651. PATENTED JULY 4, 1905.
R. A. FESSENDEN.
AERIAL FOR WIRELESS SIGNALING.
APPLICATION FILED MAR. 30, 1905.

8 SHEETS—SHEET 8.

Witnesses:
Fred Kirchner
Herbert Bradley.

Inventor,
Reginald A. Fessenden
by Dennis S. Wolcott
Attorney.

No. 793,651.

Patented July 4, 1905.

UNITED STATES PATENT OFFICE.

REGINALD A. FESSENDEN, OF WASHINGTON, DISTRICT OF COLUMBIA.

AERIAL FOR WIRELESS SIGNALING.

SPECIFICATION forming part of Letters Patent No. 793,651, dated July 4, 1905.

Application filed March 30, 1905. Serial No. 252,942.

*To all whom it may concern:*

Be it known that I, REGINALD A. FESSENDEN, a citizen of the United States, residing at Washington, District of Columbia, have invented or discovered certain new and useful Improvements in Aerials for Wireless Signaling, of which improvements the following is a specification.

The invention described herein relates to certain improvements in aerials for transmission and receipt of electromagnetic waves over long distances.

Heretofore in the transmission of power by electromagnetic waves great difficulty has been met in providing a suitable antenna, more especially in obtaining one of suitable height with suitable mechanical and electrical strength.

The invention described herein has for its object a construction of antennæ or aerials embodying the desirable features of such an element.

The invention is hereinafter more fully described and claimed.

Figure 7:
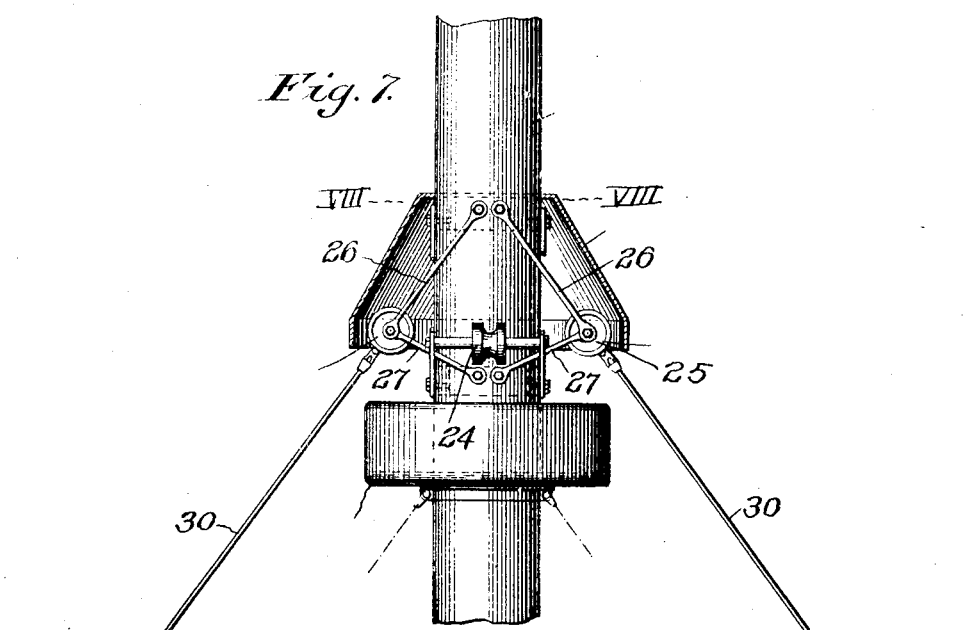
Figure 8:
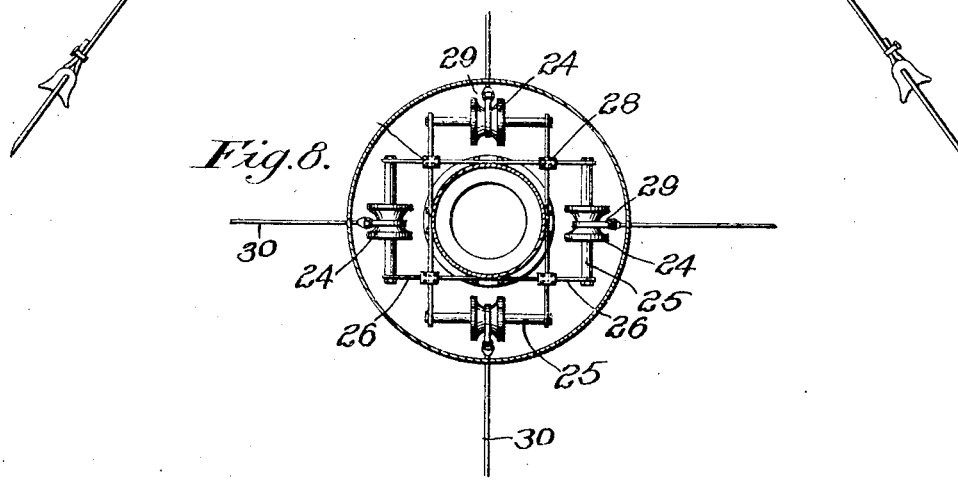
Figure 16:
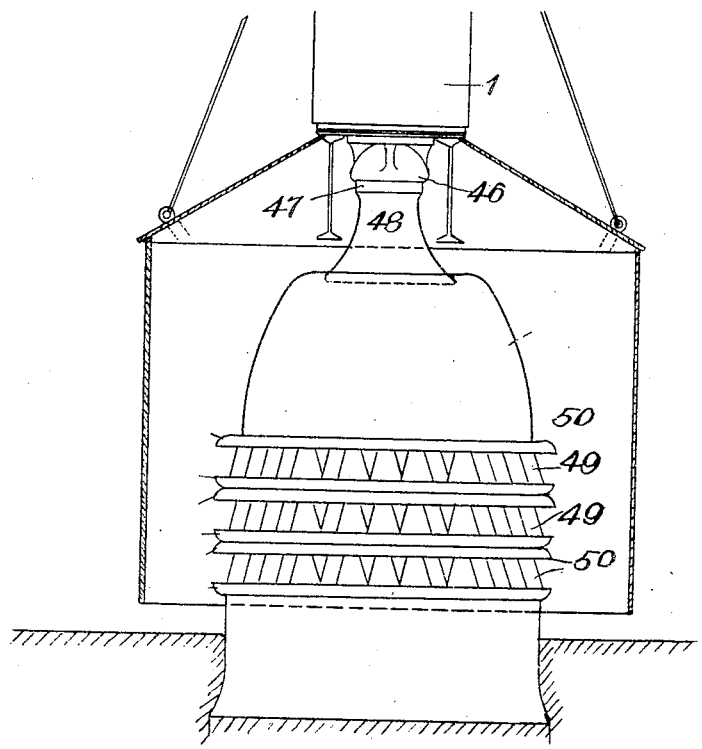
Figure 17:
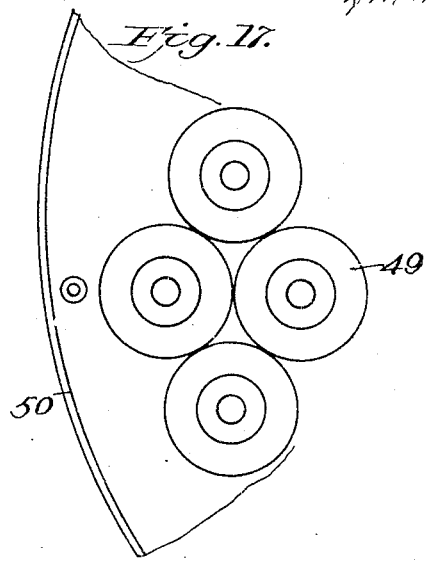
Figure 18:
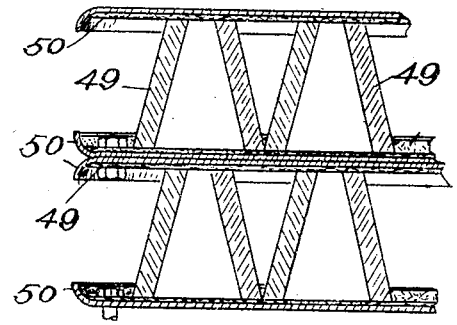
Figure 22:
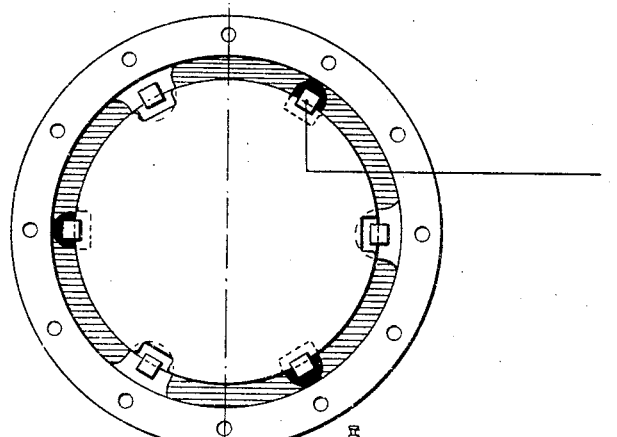
Figure 21:
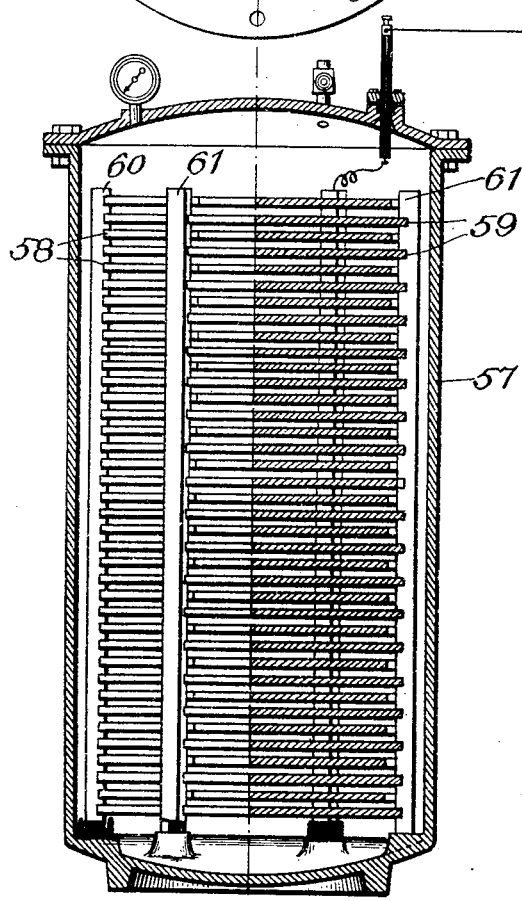

In the accompanying drawings, forming a part of this specification, Figure 1 is a top plan view of my improved aerial. Fig. 2 is a side elevation of the same. Figs. 3 and 4 illustrate two forms or constructions of joints or connections between adjacent sections. Fig. 5 is a sectional detail view illustrating the manner of connecting temporary or auxiliary guys to the aerial. Fig. 6 is a sectional plan view of Fig. 4. Fig. 7 is a view, partly in section and partly in elevation, illustrating the manner of connecting the permanent guys to the aerial. Fig. 8 is a sectional plan view on a plane indicated by the line VIII VIII, Fig. 7. Fig. 9 is a sectional detail view of a suitable means for connecting the guys to the aerial and to the anchorage. Fig. 10 is a transverse section of the construction shown in Fig. 9. Figs. 11 and 12 are detail views illustrating the manner of connecting intermediate sections of the guys. Figs. 13 and 15 are views, partly in section and partly in elevation, illustrating modifications of the constructions shown in Figs. 11 and 12. Fig. 14 is a view showing several sections of the guys connected together by the constructions shown in Figs. 13 and 14. Fig. 16 is a view, partly in section and partly in elevation, of the foundation of the aerial. Figs. 17 and 18 are detail views of parts of the foundation. Figs. 19 and 20 illustrate a manner of applying dynamometers to the guys for equalizing the strains thereof, and Figs. 21 and 22 are sectional elevations and plans of desirable form of condenser to be used in connection with my improved aerial.

In the practice of my invention the aerial is formed of a number of sections 1, connected together in the manner hereinafter described and provided at the top with a crown or collection of wires 2, radiating from the aerial at points near the top of same and having their ends connected to a hoop 3, which is supported by gaffs 4. The sections 1 are secured together by suitable joints with or without suitable insulation between the sections or members of the joints. In Fig. 3 I have shown a form of joint in which each section of the aerial is insulated from adjacent sections. The cylindrical sections, which are riveted or bolted to the castings 5 and 6, are adapted to be held together by bolts 7. The castings are insulated from each other by a fiber washer 8, preferably extending at its edge beyond the edges of the meeting faces of the castings, so that there will be no liability of moisture forming a bridge from one section to the other. It is preferred to form the castings 5 with extending lips 9, which project over the edges of the insulating-disk and form draining-surfaces to carry away moisture from the joints. The nuts and heads of the bolts are insulated by fiber washers 10 from the castings, such washers being preferably interposed between bearing-plates 11 and the heads of the bolts and nuts, as shown. Where the sections of the aerial are insulated from each other, as described, they may be electrically connected by a suitable means for modifying the wave length. This means may consist of an inductance-coil 12, a condenser such as shown in Figs. 21 and 22, or both. By properly proportioning the inductance or capacity, or both, antenna or aerial may be divided into a number of sections electrically, each section being resonant to any desired periodicity. In Figs. 4 and 6 I have shown a suitable joint for connecting the aerial-sections where no insulation is required. This joint consists of ring-castings 16 and 17, bolted or riveted to the cylindrical sections and clamped together by means of bolts 18 passing through flanges on the rings. It is preferred that one of the ring-castings should be socketed or recessed for the reception of the other casting, and it is also preferred that the vertical wall of such socket or recess should be extended out slightly, as at 19, to form a drainage-surface.

A convenient means for attaching temporary or auxiliary guys to the aerials consists of castings 20, secured to the sections at different points around its perimeter. These castings are provided with vertical webs, through which pass pins 21 for engagement with the eyes of the clevis 22, to which the guys 23 are secured.

The permanent guys are preferably secured to the mast or aerial in the manner shown in Figs. 7 and 8. As therein shown a spool 24, formed of porcelain or other insulating material, is mounted on the shaft 25, the ends of which are connected by straps 26 and 27 to the sections of the aerials. Where four or more guys extend from the same point, or practically the same point, of the section, the straps 26 and 27, supporting one spool, will cross the corresponding straps of another spool, and for the sake of strength and rigidity crossing straps are clamped together and brace up castings 28. The guys 30 are connected to the spools by straps 29 passing around the same. While suitable spools of insulating material mounted on the shafts, as described, may be used, it is preferred that the construction shown in Figs. 9 and 10 be employed. In this construction shaft 25 is made tapering from its center and is provided with journals at its ends for the reception of the straps 26 and 27, said straps being held in place by the nuts. This shaft is surrounded by a porcelain sleeve 32, bearing on the shaft along its straight or flattened middle portion, a bushing of fiber or other insulating material being preferably interposed between the shaft and sleeve 32. The sleeve is preferably made of a length equal to the distance between the journals on the ends of the shaft, and the ends thereof are protected by leather or fiber bushings from the straps 26 and 27. The spool is made up of a series of overlapping or intercalating porcelain cylinders or shells 33, held in proper relation to each other by cement, as shown. A bushing of leather or fiber is preferably interposed between the spool and the strap 29 for connecting the spool to the guys. The connection between the guys and the spool is formed by a block 34, bearing against the spool and provided with trunnions 35 for the reception of the eyes of the clevis 36. The strap 29 passes around this block, firmly clamping it to the spool.

In order to connect the sections on the guys, a double saddle 37 is provided, formed with transverse passages 38 and 39 therethrough for the passage of the guys, as shown in Figs. 11 and 12, and formed of porcelain or other suitable insulating material. While this construction forms an effective union between adjacent sections of the guys, it is preferred to employ the construction shown in Figs. 13 and 15. In this construction one part or member consists of a yoke 40, having a socket for attachment to the wire guy, and a pin 41, passing transversely through the arms of the yoke. On this pin is mounted a wheel 42, preferably metal and surrounded by a sleeve 43, of porcelain or other insulating material, a fiber or leather bushing 44 being interposed between the sleeve and the wheel. This sleeve is preferably grooved to form a seat or bearing for the guy passing around it, and in practice it is preferred to interpose a bushing of leather or fiber or other suitable material between the guy and the bearing-sleeve. To protect this joint or connection from rain, sleet, &c., a hood or shield 45 is attached to the guys and extends around and over the joint, as shown.

As it is preferred that the aerial or antenna should have some freedom of movement independent of the foundation, a ball-and-socket or rocking joint is provided at the lower end of the lowest section. This joint consists of a cup-shaped portion 46 and a bell 47, one of which is secured to the aerial and the other to the foundation. In the construction shown the cup portion is secured to the lowest section of the aerial, and the ball portion is formed on the top of the pedestal 48, embedded in the upper cement portion of the foundation. Between the upper and lower cement portions of the foundation is interposed a suitable insulation. A desirable construction of insulation consists of one, two, or more series of cones 49, formed of porcelain or other suitable insulating material. When two or more series of cones are employed, the cones of one series have their bases embedded in a cement in a pan 50, having upturned edges, and their upper ends embedded in cement in similar but inverted pan. When two or more series of this insulating means are employed, adjacent pans are secured together by bolts and rivets, as shown.

In order to regulate the strain on the several guys around the aerial, means are provided for attaching dynamometers 51 thereto. This means consists of two blocks having transversely-tapering arms extending therefrom, onto which are passed the rings 53, connected to the dynamometers. The position of these rings on the arms is determined and regulated by means of wedges 54, passing through the arms. As the arms are tapered as described, an inward or outward movement of the rings along the arms will cause the latter to move up or down, thus providing for a very fine adjustment of the strains. When the dynamometers have been applied, the turnbuckle 55, normally connecting these blocks, is loosened up, so that the strain will come upon the dynamometers, and the turnbuckles 56 adjusted so as to bring the proper strain upon the guys.

In Figs. 21 and 22 I have shown a form of condenser which I prefer to employ in connection with my improved aerial. This condenser, which is fully described in application for Letters Patent, Serial No. 252,944, filed March 30, 1905, consists of a tank or shell 57, in which are arranged two series of plates or members 58 and 59. The plates of one series are secured at their peripheries to posts 60, and the plates of the second series, which alternate with those of the first series, are secured to posts 61. The main dielectric is formed by gas under pressure.

Provision may be made for access to any part of the aerial, preferably by internal ladder or by a suitable hoisting mechanism. By using cylindrical sections of suitable diameter—say three feet—a great height—as, for example, four or five hundred feet—may be obtained.

I claim herein as my invention—

1. An aerial for the transmission and receipt of electromagnetic wave energy, consisting of a cylindrical structure insulated at its base from the ground and itself forming the whole or a portion of the antennæ.

2. An aerial for the transmission and receipt of electromagnetic wave energy, a cylindrical structure formed of longitudinal sections, insulated at its base from the ground and itself forming the whole or a portion of the antennæ.

3. An aerial for the transmission and receipt of electromagnetic wave energy consisting of a cylindrical structure having its support formed of insulating material and having lateral guys insulated from the aerial and from ground.

4. An aerial for the transmission and receipt of electromagnetic wave energy consisting of a series of sections insulated from each other and means for adjusting the resonance of each section.

5. An aerial for the transmission and receipt of electromagnetic energy consisting of a series of connected sections forming a portion of the antennæ and a group or crown of wires supported by the structure.

6. An aerial for the transmission and receipt of electromagnetic energy having in combination a base, a cylindrical structure having a pivotal support on the base and guys for holding the structure in a vertical position said structure forming the whole or a portion of the antennæ.

7. An aerial for the transmission and receipt of electromagnetic wave energy having in combination a base including therein an insulating-section, a metallic vertical portion having a pivotal support on the base above the insulating-section, and guys insulated from the metallic portion and from ground for holding the metallic portion in a vertical position.

8. An aerial for the transmission and receipt of electromagnetic wave energy having in combination a base, a metallic vertical portion having a pivotal support on the base, and guys for holding the metallic portion in a vertical position, said metallic portion forming the whole or a portion of the antennæ.

9. An aerial for the transmission and receipt of electromagnetic wave energy having in combination a base having included therein an insulating-section, and a metallic vertical portion resting on the base above the insulating-section and itself forming the whole or a portion of the antennæ.

In testimony whereof I have hereunto set my hand.

REGINALD A. FESSENDEN.

Witnesses:
 THOMAS P. BROWN,
 JESSIE E. BENT.